United States Patent
Chen et al.

[11] Patent Number: 5,875,561
[45] Date of Patent: Mar. 2, 1999

[54] DIGITAL COMPASS

[76] Inventors: Chi Chung Chen; Yang Ning Pi, both of 8728 Beverly Hill, Houston, Tex. 77063

[21] Appl. No.: 804,822

[22] Filed: Feb. 24, 1997

[51] Int. Cl.$^6$ ................ G01B 7/02; G01B 7/30
[52] U.S. Cl. .................. 33/784; 33/558.01
[58] Field of Search .................. 33/27.02, 706, 33/708, 783, 784, 794, 797, 798, 799, 807, 808, 558.01, 558.04

[56] References Cited

U.S. PATENT DOCUMENTS

| | | | |
|---|---|---|---|
| 297,492 | 4/1884 | Bovensiep | 33/558.04 |
| 3,129,514 | 4/1964 | Lintner | 33/558.01 |
| 3,358,371 | 12/1967 | Liesong, Sr. | 33/27.02 |
| 4,468,860 | 9/1984 | Rodengen | 33/784 |
| 5,056,238 | 10/1991 | Chi | 33/783 |
| 5,115,571 | 5/1992 | Mackin | 33/27.02 |
| 5,398,577 | 3/1995 | Pierce | 33/558.01 |
| 5,430,954 | 7/1995 | Best et al. | 33/797 |

FOREIGN PATENT DOCUMENTS

| | | | |
|---|---|---|---|
| 3400537 | 7/1985 | Germany | 33/27.02 |
| 119874 | 10/1947 | Sweden | 33/807 |
| 2155407 | 9/1985 | United Kingdom | 33/27.02 |

*Primary Examiner*—G. Bradley Bennett

[57] ABSTRACT

A digital compass has a digital screen that shows the distance between compass legs, one half the angle between the compass legs, and a ratio between half of an inductive rod raising value to a length of the compass leg from a compass leg mounting point to a carrier arm mounting point. The information on the digital screen is sufficient for operation of the compass, such as dividing a circle into equal arcs.

20 Claims, 3 Drawing Sheets

DIGITAL COMPASS

FIELD OF THE INVENTION

The present invention relates to precision tools. More particularly, the present invention relates to tools used for working with sheet metal and for preparing technology drawings.

BACKGROUND OF THE INVENTION

Precision tools for working with sheet metal or preparing technology drawings typically include a mechanical compass that optionally has a scale for reading a distance between the compass legs. The mechanical compass is used for drawing circles or for transferring a distance between fixed points to another point on a drawing or work piece. Many uses for a compass rely on the precise operation of the components and do not require accurate measurement of the distance between the compass legs. The distance between the compass legs is typically measured with a precision ruler when accuracy is needed. The combination of a compass and a precision ruler in one device would simplify use of the compass when accurate measurements are needed.

SUMMARY OF THE INVENTION

The present invention provides a digital compass that displays a precise measurement of a distance between compass legs. The digital compass includes duplex gears that transfer movement of the compass legs to movement of an inductive rod that varies an electrical pulse received by an electronic unit. A digital display shows the output from the electronic unit including the distance between the compass legs, the angle between one of the compass legs and a centerline, and a ratio between half of an inductive rod raising value to a length of the compass leg from a compass leg mounting point to a carrier arm mounting point. The information on the digital screen is sufficient for operation of the compass, such as dividing a circle into equal arcs.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate specific embodiments of this invention and are therefor not to be considered limiting of its scope, for the invention may admit to other equally effective embodiments.

DETAILED DESCRIPTION OF THE INVENTION

The present invention provides a digital compass that displays a precise measurement of a distance between compass legs. The digital compass includes duplex gears that transfer movement of the compass legs to movement of an inductive rod that varies an electrical pulse received by an electronic unit. A digital display shows the output from the electronic unit including a precise distance between the compass legs, one-half the angle between the compass legs, and a ratio between half of an inductive rod raising value to a length of the compass leg from a compass leg mounting point to a carrier arm mounting point. The information on the digital screen is sufficient for operation of the compass, such as dividing a circle into equal arcs.

Description of a Preferred Embodiment

Figure 1:
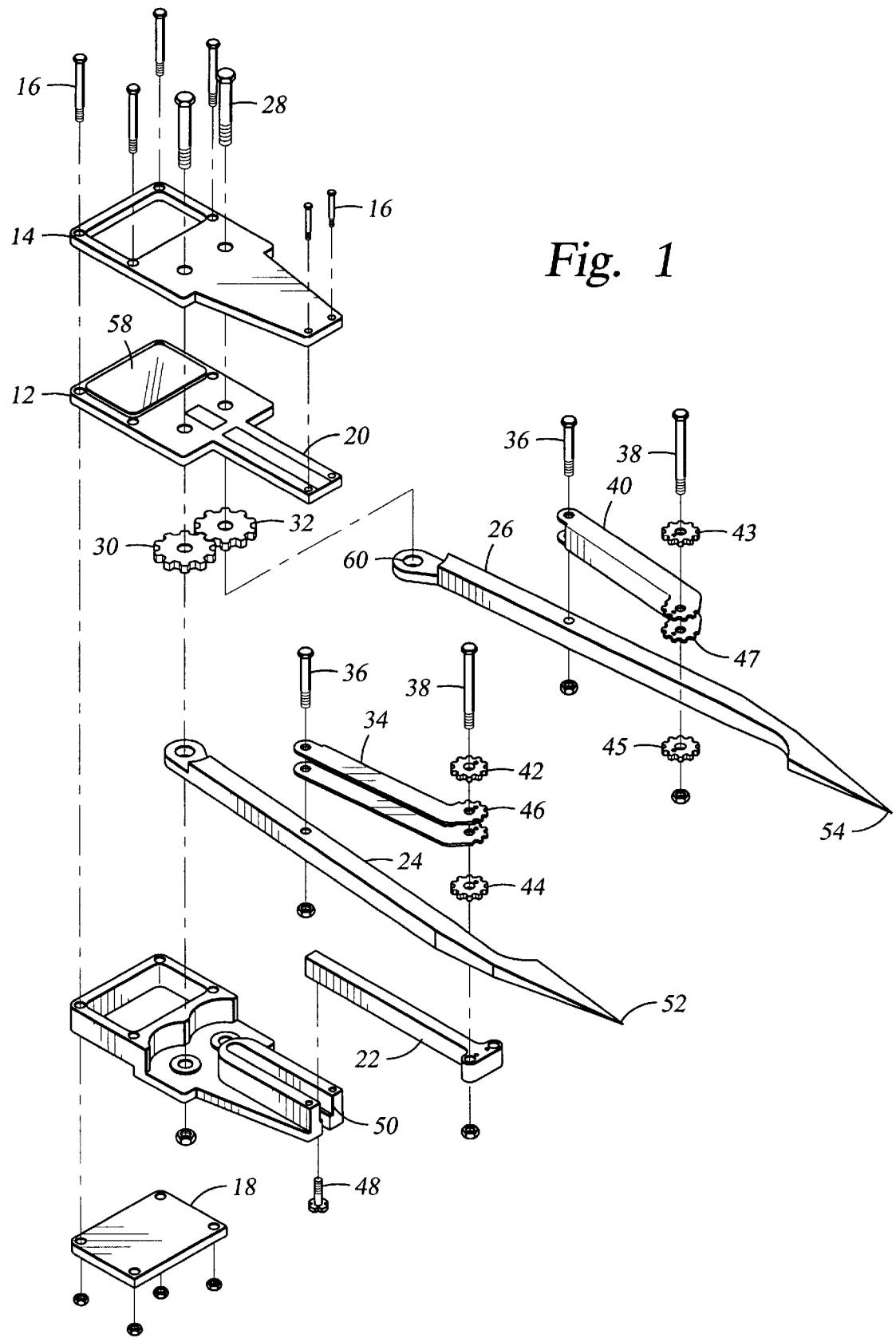
FIG. 1 is an assembly view of components of a preferred digital compass.
Figure 2:
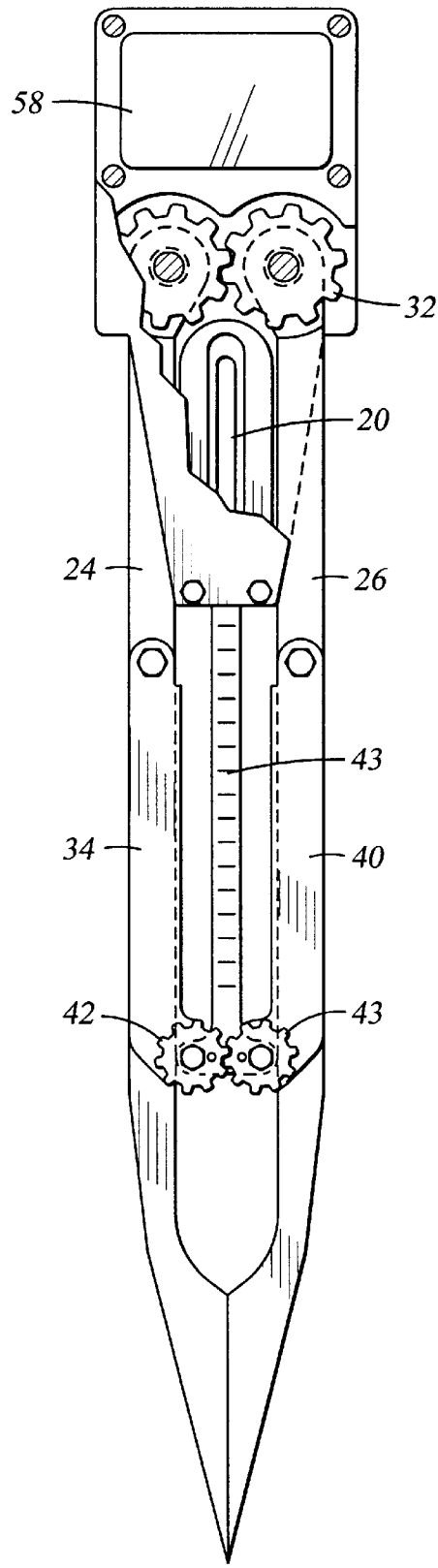
FIG. 2 is a front schematic view of the digital compass of FIG. 1.
Figure 3:
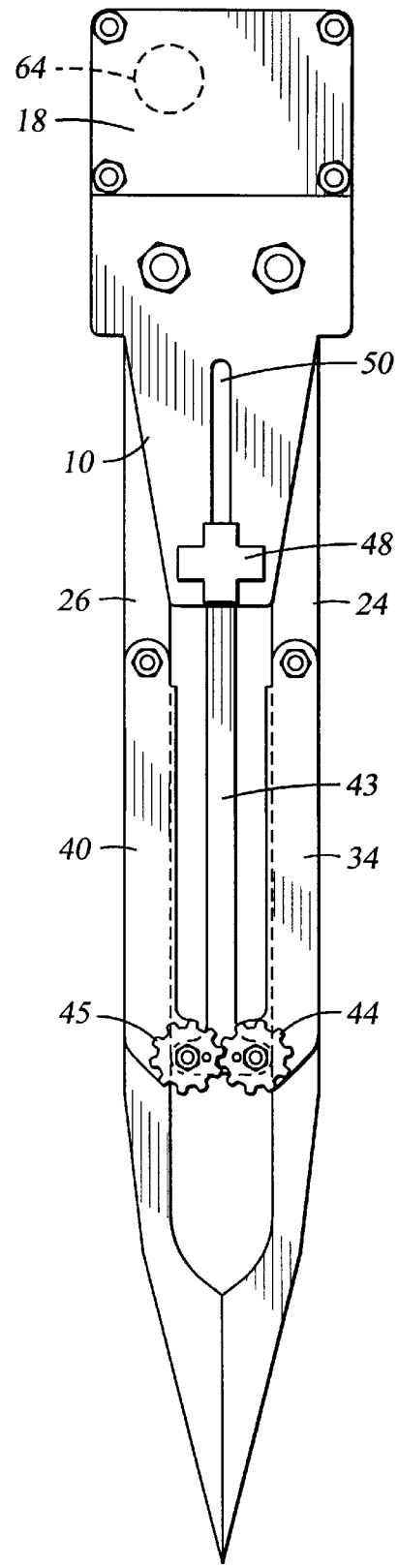
FIG. 3 is a rear schematic view of the digital compass of FIG. 1.

Referring to FIGS. 1, 2 and 3, a preferred digital compass has a compass body comprising a compass support 10, and electronic board 12, and a surface board 14 held together by screws 16. The compass support has a battery compartment secured by a battery cover 18. The electronic board 12 has an inductor sleeve 20 that receives an inductor rod 22 as described below. A first compass leg 24 and a second compass leg 26 are secured by bolts 28 to the compass body 10. A first pair of duplex gears 30, 32 are press fit onto bolts 28. The first pair of duplex gears 30, 32 mesh to provide synchronized movement of the compass legs 24, 26.

A first carrier arm 34 is pivotally connected by bolts 36 to a central portion of the first compass leg 24 and pivotally connected to the inductor rod 22 by bolts 38. A second carrier arm 40 is pivotally connected by bolts 36 to a central portion of the second compass leg 26 and pivotally connected by bolts 38 to the inductor rod 22. A second pair of duplex gears 42, 43 and a third pair of duplex gears 44, 45 are press fit onto the bolts 36, 38 on opposite sides of each carrier arm 34, 40. Each pair of duplex gears mesh to provide synchronized movement of the first and second carrier arms 34, 40, and synchronized movement of the compass legs 24, 26. One layer of half circle duplex gears 46, 47 are press fit onto the carrier arms 34, 40 as half circle type. Because duplex gears overlap one another, the pitch of the gears is reduced and teeth are doubled. The interior and exterior gears provide firm and precise operation of the digital compass. The carrier arms 34, 40 have a channel configuration to fit around the compass legs 24, 26. Each carrier arm 34, 40 functions as a pair of carrier arms having separate duplex gears for more precise control of the compass legs 24, 26. The carrier arms 34, 40 are mounted on the inner side of the compass legs 24, 26 to defend against impact.

The inductor rod 22 slides within the inductor sleeve 20 and can be locked in place by a locking knob 48 that slides in a groove 50 in the compass support 10. The inductor rod 22 inducts an electronic pulse with printer scale sent to the electronic board 12. The electronic board 12 also receives an inducted electronic pulse with printer scale from the teeth of one of the gears in the first pair of duplex gears 30, 32. The electronic board 12 computes the precise distance between the ends 52, 54 of the compass legs 24, 26 from the position of the inductor rod 22 in the inductor sleeve 20. Raising of the inductor rod 22 sends more electronic pulse to the electronic board 12. The electronic board 12 also computes the angle between a compass leg 24 and a compass center line 56 as described below for FIGS. 5A and 5B.

The digital compass has a display screen 58 that displays the precise distance between the compass legs, one-half of an angle between the compass legs, and a ratio between half of an inductive rod raising value "x" (see FIG. 5B) to a length of the compass leg "c" from a compass leg mounting point 60 to a carrier arm mounting point 62. The electronic board 12 and display screen 58 are powered by a 3 V battery 64.

Example of Operation

Figure 4:
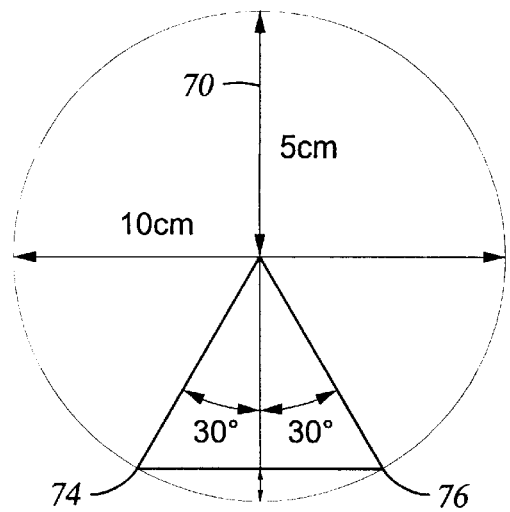
FIG. 4 is a sketch showing division of a circle into equal arcs.
Figure 5A:
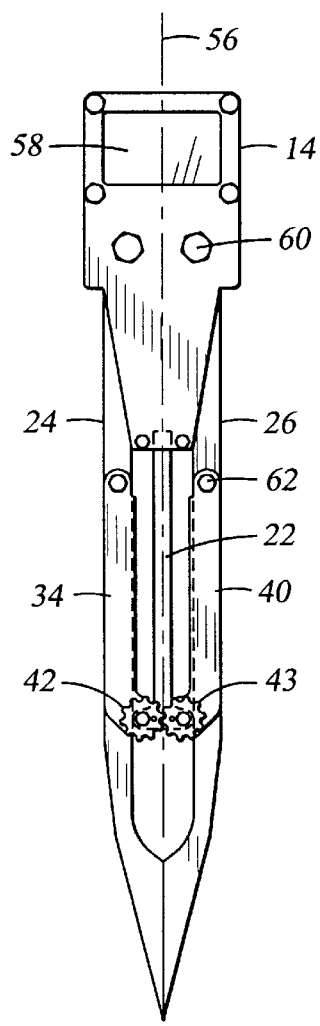
FIG. 5A is a front schematic view of the digital compass of FIG. 1 showing a closed position.
Figure 5B:
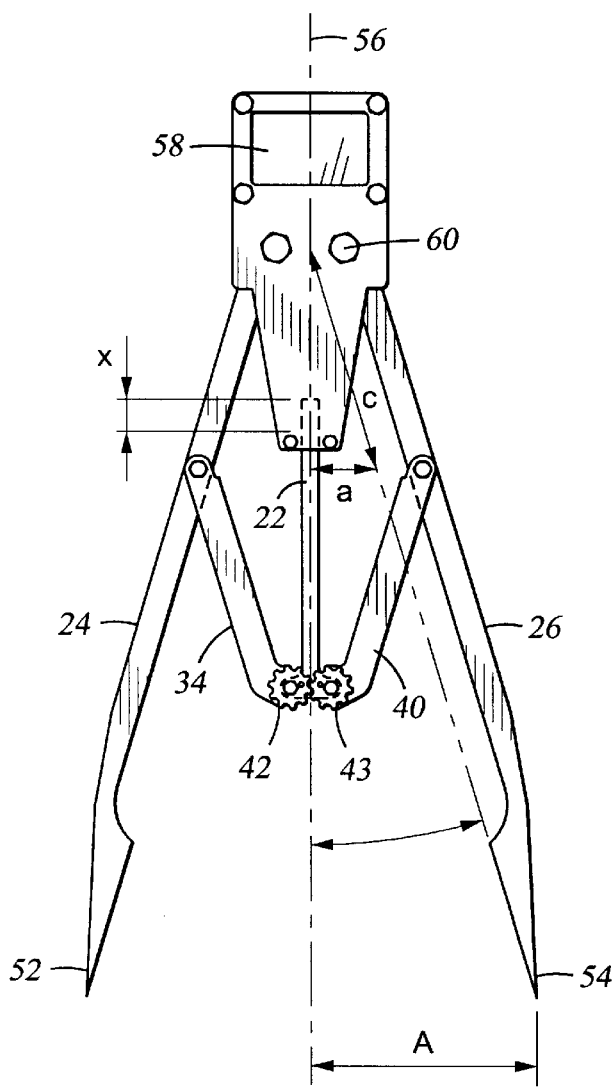
FIG. 5B is a front schematic view of the digital compass of FIG. 1 showing an open position for comparison with FIG. 5A.

Operation of the digital compass is demonstrated in FIGS. 4, 5A, and 5B. In order to divide a 10 cm circle into six parts as shown in FIG. 4, it is known that each part is a pie-shaped segment having an interior angle of 360°/6 which is 60°. When the compass is closed as shown in FIG. 5A, the compass angle between the center line 56 and a compass leg 26 is 0°. When the compass is opened as shown in FIG. 5B, a right triangle 66 is formed by the center line 56, the compass leg 26, and a line segment "A" from the center line 56 to the end 54 of the compass leg 26. The precise distance between the compass legs is 2A which is calculated from a smaller right triangle 68 having sides that are one-third the sides of the larger triangle 66 for the embodiment shown in FIGS. 5A and 5B. The smaller triangle 68 has a hypotenuse of "c" that is the distance from the compass leg mounting point 60 to the carrier arm mounting point 62. Line segment "a" is the distance from the center line to the carrier arm mounting point 62 and is equal to A/3 for the present embodiment. The line segment along the center line is (c−x/2) wherein "x" is the distance that the inductor rod 22 is raised into the inductor sleeve 20. Since the inductor rod 22 moves with a double stroke, the segment of smaller triangle 68 along the center line 56 is shortened by one-half of the raising value x. In actual practice, "x" is calibrated by separating the compass legs 24, 26 by a known distance and adjusting the magnitude of the signal received by the electronic board 12 until the display 58 reads the correct distance.

Using the Pythagorean Theorem for right triangles, it is known that $a=(c^2-(c-x/2)^2)^{1/2}x$. The distance between the carrier arm mounting points on both compass legs is expressed by:

$$2a=2(c^2-(c-x/2)^2)^{1/2}=(4cx-x^2)^{1/2}.$$

For A=3a in the present embodiment, the precise distance between the compass legs is 2A which is expressed by $$2A=3(4cx-x^2)^{1/2}.$$

Returning to the problem of dividing the 10 cm circle in FIG. 4 into six parts, the angle between the compass legs 24, 26 is manually adjusted until the screen displays an angle of 30° which is one half the desired angle of each of the six pie shaped segments. The display then shows a ratio of 115/1000 (and precise length of 279.3 mm for the distance between the compass legs). The ratio is used to calculate the raising value "x" for the desired pie shaped segment by "x"=radius x ratio=10 cm/2×115/1000=5.75 mm. The raising value "x" is then marked of on the end of a centerline 70 through the pie shaped segment using the digital compass or other calibrated device, and a perpendicular line 72 is drawn as shown in FIG. 4 using the digital compass. The perpendicular line 72 intersects with the circle at two points 74, 76 and the digital compass can then be used to mark of additional points of intersection for additional pie shaped segments.

Further embodiments of the invention are apparent from the preceding disclosure of the invention, and the scope of the invention is defined by the following claims and not by the embodiments.

What is claimed is:

1. A digital compass, comprising:
   a compass body having an inductor sleeve;
   two compass legs pivotally connected to the compass body at a first end of each compass leg;
   an inductor rod engaged in the inductor sleeve;
   at least one carrier arm pivotally connected to a central portion of one of the compass legs and pivotally connected to the inductor rod; and
   a display that shows a precise distance between second ends of the compass legs.

2. The digital compass of claim 1, wherein the compass legs are pivotally connected to the compass support body by a pair of duplex gears that mesh to provide synchronized movement of the compass legs.

3. The digital compass of claim 1, wherein two carrier arms are pivotally connected inductor rod and one carrier arm is pivotally connected to a central portion of one compass leg and the other carrier arm is pivotally connected to the a central portion of the other compass leg.

4. The digital compass of claim 1, wherein the first and second carrier arms are pivotally connected to the inductor rod by at least one pair of duplex gears that mesh to provide synchronized movement of the carrier arms.

5. The digital compass of claim 1, wherein the display shows one-half the angle between the compass legs and a ratio between half of an inductive rod raising value to a length of the compass legs from a compass leg mounting point to a carrier arm mounting point.

6. A digital compass, comprising:
   a compass body having an inductor sleeve;
   first and second compass legs pivotally connected to the compass body by a first pair of duplex gears at a first end of each compass leg;
   an inductor rod engaged in the inductor sleeve, wherein the inductor rod slides in the inductor sleeve;
   a first carrier arm pivotally connected to a central portion of the first compass leg and pivotally connected by a second pair of duplex gears to the inductor rod;
   a second carrier arm pivotally connected to a central portion of the second compass leg and pivotally connected by the second pair of duplex gears to the inductor rod; and
   a display that shows a precise distance between second ends of the compass legs.

7. The digital compass of claim 6, wherein the first pair of duplex gears mesh to provide synchronized movement of the compass legs.

8. The digital compass of claim 6, wherein the second pair of duplex gears mesh to provide synchronized movement of the carrier arms.

9. The digital compass of claim 6, wherein the compass body includes an electronic board that computes the precise distance between the second ends of the compass legs from the position of the inductor rod within the inductor sleeve.

10. The digital compass of claim 6, wherein the carrier arms have a channel shape and are connected by the second pair of duplex gears and a third pair of duplex gears.

11. The digital compass of claim 6, wherein the inductor rod includes a lock knob that slides within a groove in the inductor sleeve when unlocked.

12. The digital compass of claim 6, wherein the display shows one-half of an angle between the compass legs.

13. The digital compass of claim 12, wherein the display shows a ratio between half of an inductive rod raising value to a length of the compass leg from a compass leg mounting point to a carrier arm mounting point.

14. A digital compass, comprising:
   a compass body having an electronic board and an inductor sleeve;
   first and second compass legs pivotally connected to the compass body by a first pair of duplex gears at a first end of each compass leg, wherein the first pair of duplex gears mesh to provide synchronized movement of the compass legs;

an inductor rod engaged in the inductor sleeve, wherein the inductor rod slides in the inductor sleeve;

a first carrier arm pivotally connected to a central portion of the first compass leg and pivotally connected by a second pair of duplex gears and a third pair of duplex gears to the inductor rod;

a second carrier arm pivotally connected to a central portion of the second compass leg and pivotally connected by the second pair of duplex gears and the third pair of duplex gears to the inductor rod;

a display that shows a precise distance between second ends of the compass legs.

15. The digital compass of claim 14, wherein the second pair of duplex gears mesh to provide synchronized movement of the first and second carrier arms.

16. The digital compass of claim 15, wherein the third pair of duplex gears mesh to provide synchronized movement of the first and second carrier arms.

17. The digital compass of claim 16, wherein the electronic board computes the precise distance between the second ends of the compass legs from the position of the inductor rod.

18. The digital compass of claim 17, wherein the inductor rod includes a lock knob that slides within a groove in the inductor sleeve when unlocked.

19. The digital compass of claim 18, wherein the display shows one-half of an angle between the compass legs.

20. The digital compass of claim 19, wherein the display shows a ratio between half of an inductive rod raising value to a length of the compass leg from a compass leg mounting point to a carrier arm mounting point.

* * * * *